United States Patent
Bower, III et al.

(10) Patent No.: US 9,176,923 B2
(45) Date of Patent: Nov. 3, 2015

(54) ELECTRONIC GUIDANCE FOR RESTORING A PREDETERMINED CABLING CONFIGURATION

(75) Inventors: Fred A. Bower, III, Durham, NC (US); Michael H. Nolterieke, Raleigh, NC (US); William G. Pagan, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 1326 days.

(21) Appl. No.: 12/971,749

(22) Filed: Dec. 17, 2010

(65) Prior Publication Data

US 2012/0154165 A1 Jun. 21, 2012

(51) Int. Cl.
*G08B 21/00* (2006.01)
*G06F 15/16* (2006.01)

(52) U.S. Cl.
CPC .................................. *G06F 15/161* (2013.01)

(58) Field of Classification Search
CPC .. G08B 13/02; G08B 13/1409; G06F 15/161; G06F 15/16; F21V 1/00
USPC ....... 340/686.1, 687, 691.1; 200/51 R, 51.02, 200/51.07; 307/9.1, 11
See application file for complete search history.

(56) References Cited

U.S. PATENT DOCUMENTS

| | | | |
|---|---|---|---|
| 4,886,335 A * | 12/1989 | Yanagawa et al. | .............. 385/16 |
| 5,170,113 A | 12/1992 | Albonesi | |
| 5,222,164 A | 6/1993 | Bass et al. | |
| 5,603,619 A * | 2/1997 | Turner et al. | .................... 439/69 |
| 5,924,889 A | 7/1999 | Wang et al. | |
| 6,532,328 B1 | 3/2003 | Kline | |
| 6,640,272 B1 | 10/2003 | Hartwell et al. | |
| 6,784,802 B1 | 8/2004 | Stanescu | |
| 6,857,897 B2 | 2/2005 | Conn | |
| 7,088,880 B1 | 8/2006 | Gershman | |
| 7,337,227 B1 * | 2/2008 | Hsieh et al. | .................... 709/227 |
| 7,370,106 B2 * | 5/2008 | Caveney | ....................... 709/224 |

(Continued)

FOREIGN PATENT DOCUMENTS

| | | |
|---|---|---|
| CN | 1629973 A | 6/2005 |
| JP | 5003060 A | 1/1993 |
| JP | 10308796 A | 11/1998 |

OTHER PUBLICATIONS

Physical Layer Intelligence, "Intelligence at the Physical Layer 'Smart Cabling—Better Security'", SIDMON, www.siemon.com, 2007 WP_Intelligence Rev. B Nov. 2007, 4 pages.

(Continued)

*Primary Examiner* — Kerri McNally
(74) *Attorney, Agent, or Firm* — Katherine S. Brown; Jeffrey L. Streets

(57) ABSTRACT

In one embodiment, a computer system has a plurality of chassis interconnected by cables. Each cable initially connects a unique port pair consisting of a port of one chassis and a port of another chassis. The disconnection of cables is monitored, including electronically recording a disconnection sequence in which the port pairs are disconnected by removing each cable from at least one port of the respective port pair. Visual guidance is provided for re-cabling the computer system by sequentially identifying the port pairs in a reversal of the disconnection sequence, wherein identifying each port pair includes illuminating visual indicators associated with the ports of each port pair with a matching illumination pattern.

19 Claims, 3 Drawing Sheets

(56) References Cited

U.S. PATENT DOCUMENTS

| | | | |
|---|---|---|---|
| 7,717,734 B2 | 5/2010 | Caveney et al. | |
| 7,748,199 B2 | 7/2010 | Sankaran et al. | |
| 8,516,089 B2* | 8/2013 | Johnsen et al. | 709/221 |
| 8,638,651 B2* | 1/2014 | Michaelis et al. | 370/200 |
| 2004/0088208 A1 | 5/2004 | Runge et al. | |
| 2005/0198247 A1 | 9/2005 | Perry et al. | |
| 2005/0275626 A1 | 12/2005 | Mueller et al. | |
| 2006/0005055 A1 | 1/2006 | Potega | |
| 2006/0074730 A1 | 4/2006 | Shukla et al. | |
| 2006/0095667 A1 | 5/2006 | Suzuki et al. | |
| 2006/0282529 A1* | 12/2006 | Nordin | 709/224 |
| 2007/0195711 A1* | 8/2007 | Morris et al. | 370/254 |
| 2007/0286411 A1 | 12/2007 | King et al. | |
| 2007/0293236 A1 | 12/2007 | Cox et al. | |
| 2008/0133047 A1 | 6/2008 | Best et al. | |
| 2009/0216910 A1 | 8/2009 | Duchesneau | |

OTHER PUBLICATIONS

Chinese Office Action (non English paper), paper No. 100034 dated Oct. 9, 2010, 200710167582.2, pp. 1-9.

* cited by examiner

| Reconnect Sequence | Chassis A | | | | Chassis B | | | | Chassis C | | | | Chassis D | | | |
|---|---|---|---|---|---|---|---|---|---|---|---|---|---|---|---|---|
| | A1 | A2 | A3 | A4 | B1 | B2 | B3 | B4 | C1 | C2 | C3 | C4 | D1 | D2 | D3 | D4 |
| 1 | – | ① | – | – | ① | – | – | – | 2 | – | – | – | 3 | – | – | – |
| 2 | – | – | ② | – | – | 1 | – | – | ② | – | – | – | 3 | – | – | – |
| 3 | – | – | – | ③ | – | – | 1 | – | – | 1 | – | – | ③ | – | – | – |
| 4 | – | – | – | – | – | – | ① | – | – | ① | – | – | – | 2 | – | – |
| 5 | – | – | – | – | – | – | – | ② | – | – | – | 1 | – | ② | – | – |
| 6 | – | – | – | – | – | – | – | – | – | – | – | ① | – | – | ① | – |

FIG. 3

ELECTRONIC GUIDANCE FOR RESTORING A PREDETERMINED CABLING CONFIGURATION

BACKGROUND

1. Field of the Invention

The present invention relates to scalable computer systems, and more particularly to interconnecting multiple server chassis of a scalable computer system.

2. Background of the Related Art

Large computer systems are commonly assembled from a plurality of rack-mountable server chassis, such as in a datacenter. A datacenter typically includes numerous equipment racks which collectively support a large number of server chassis in a high-density server configuration. Each server generally includes a plurality of connection ports providing scalability by allowing any number of chassis to be interconnected in a desired configuration. The particular configuration of such a computer system is determined in part by the specific connections made between ports using cables, and may require or be facilitated by making the connections in a particular sequence. The numerous connections and the specific manner in which chassis must be connected to achieve a particular configuration can make assembling a computer system on-site challenging and time-consuming.

Furthermore, a computer manufacturer or system designer may desire to set up, configure and test a system in one facility before the system is shipped to its ultimate destination. Once the system has been qualified, the system is disassembled for shipment. However, if the cables do not connect the system components in the same manner as they were connected during qualification, then the system may not perform the same as it did in the test facility.

BRIEF SUMMARY

One embodiment of the present invention provides a method, comprising detecting the disconnection of cables between ports of a plurality of chassis in a computer system, wherein each cable initially connects a port of one chassis to a port of another chassis; each chassis electronically storing a sequence in which the ports of that chassis are disconnected; and guiding re-cabling of the computer system by sequentially illuminating visual indicators associated with two ports to be reconnected.

Another embodiment of the present invention provides a computer program product including computer usable program code embodied on a computer usable storage medium. The computer program product comprises computer usable program code for detecting the disconnection of cables from a plurality of ports of a computer chassis, wherein each cable initially connects a port of the computer chassis to a port of another computer chassis; computer usable program code for electronically storing a sequence in which the plurality of ports are disconnected; and computer usable program code for guiding re-cabling of the chassis by sequentially illuminating visual indicators associated with the plurality of ports.

Yet another embodiment of the present invention provides a computer system, comprising a plurality of chassis, each chassis having a plurality of communication ports. Each chassis has a plurality of visual indicators, wherein each visual indicator is uniquely associated with a respective one of the communication ports. A plurality of removable cables connect the chassis in a particular cabling configuration, wherein each cable connects a unique port pair consisting of a port of one chassis and a port of another chassis. A chassis management entity resides on each chassis, wherein each chassis management entity is configured for detecting the order in which the ports of its chassis are disconnected from their respective port pairs. The chassis management entities are configured to cooperatively visually guide a re-cabling of the computer system by sequentially identifying the port pairs to be reconnected, wherein identifying each port pair includes illuminating the visual indicators of each port pair to be reconnected using a matching illumination pattern.

BRIEF DESCRIPTION OF THE SEVERAL VIEWS OF THE DRAWINGS

FIG. 3 is a chart representing a sequence of illumination patterns used to guide the re-cabling of the four chassis to restore the cabling configuration of FIG. 1

DETAILED DESCRIPTION

Embodiments of the present invention include a system and method for electronically monitoring the removal of cables from a fully cabled computer system and for subsequently guiding the reconnection of the cables to restore the original cabling configuration. A system may initially be fully cabled according to a particular cabling configuration, such as for testing and verification at a factory. The tested and verified computer system may then be disassembled, including removing the cables, prior to packing and shipping the computer system. Management controllers consisting of hardware and software elements on the chassis can record the cabling configuration prior to disassembly, and/or track the progressive removal of cables and other entities as the system is broken down to a shippable state. After shipping the components of the system to a site, electronic visual guidance is provided by the components of the system to guide a human installer to restore the initial configuration. For example, LEDs associated with connection ports may guide a user through re-cabling the system.

In an example embodiment disclosed below, four server chassis are initially cabled in a particular cabling configuration. According to the cabling configuration, a plurality of ports of a chassis are each connected by a cable to a corresponding port of another chassis. The two ports connected by each cable are referred to as a port pair. Each chassis includes hardware and software for monitoring the disconnection of cables from the ports. Details regarding the disconnection of ports of each chassis may be electronically stored in tables. Such details include the order in which the ports of a particular chassis are disconnected, and the order in which the chassis is disconnected from the rest of the system. This electronically stored information is used to visually guide a human installer to re-cable the system by illuminating visual indicators associated with the ports. For example, the ports of each port pair to be reconnected may be illuminated with a matching visual pattern. Additionally, the visual indicators associated with each port pair may be sequentially illuminated to guide a particular sequence in which the port pairs are to be reconnected. In one embodiment, the sequence in which the port pairs are to be reconnected is the reverse of the sequence in which the port pairs were disconnected.

Figure 1:
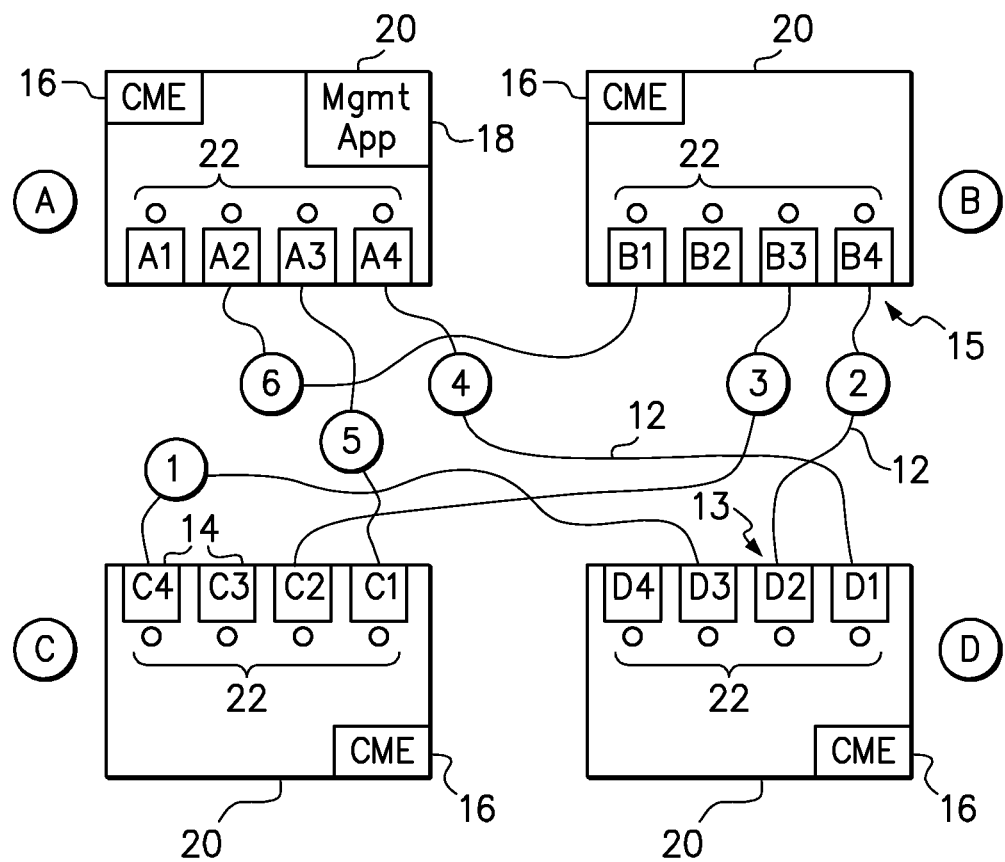
FIG. 1 is a schematic diagram of a computer system that includes four server chassis interconnected in an example of a specific cabling configuration.

FIG. 1 is a schematic diagram of an example computer system 10 that includes four server chassis 20 interconnected in a specific cabling configuration using six cables 12. The four chassis 20 are individually identified in the figure as Chassis "A," Chassis "B," Chassis "C," and Chassis "D." Each chassis 20 includes four ports 14. For purpose of discussion, each port 14 is uniquely identified in the figure by a port identifier beginning with the letter of the chassis 20. For example, Chassis A includes four ports, labeled A1, A2, A3, and A4, Chassis B includes four ports, labeled B1, B2, B3, and B4, and so forth. Each port 14 may include a connector structure that physically and electrically connects an end of a cable 12 to that port. A variety of suitable electrical connector structures are known in the art, and need not be discussed in extensive detail here. The six cables 12 are also labeled in the figure using circled numerals 1 to 6. The six cables 12 may be referred to, respectively, as Cable 1, Cable 2, etc. A plurality of electronic visual indicators 22 are provided on the chassis 20, with each visual indicator 22 being uniquely associated with a respective port 14. Each of the visual indicators 22 may comprise an illuminable element, such as a lamp or light-emitting diode (LED). The visual indicators 22 are used to visually guide the re-cabling of each chassis 20, as further discussed below.

Each cable 12 includes two ends 13, 15, and is connected at one end 13 to a specific port 14 on one chassis 20, and coupled at the other end 15 to a specific port 14 on another chassis 20. Each pair of ports connected by a cable 12 is referred to as a "port pair." Each cable 12 connects a different port pair to provide a communication pathway along the cable 12 between the two ports of the respective port pair. For example, Cable 1 connects port C4 to port D3 in a port pair C4-D3, to enable electronic communication between Chassis C at port C4 and port Chassis D at port D3 Likewise, Cable 2 connects port pair B4-D2 to enable electronic communication between ports B4 and D2, and so forth. The system 10 is considered fully cabled or fully connected in FIG. 1, in that each chassis 20 is connected to each of the other three chassis 20 by at least one cable 12.

Each chassis 20 includes a chassis management element (CME) 16. At least one of the chassis 20 includes a management appliance 18. The management appliance may be embodied as a blade that is preloaded with management software which assumes the rest of the previous CME functionality and more. The CME 16 may be entirely firmware, while the management appliance 18 may be entirely software. The CME 16 and management appliance 18 cooperate to enable guided cabling, but are different entities. The CME 16 contains low-level chassis management control code, including logic for activation of the visual indicators 22 (e.g. LEDs or lamps) involved in guiding the re-cabling of the system 10 to restore the original cabling configuration. The chassis 20 on which the management application 18 resides (in this instance, Chassis A) may be referred to as the master chassis. The master chassis may monitor and record disconnections associated with its ports 14 and the ports 14 of the other three chassis 20 in the system 10, where disconnections between the other chassis is communicated with the master chassis via the cables 12. The CME 16 on each chassis 20 and the management appliance 18 on at least one of the chassis 20 cooperate to monitor the removal of cables 12 during disassembly of the system, and subsequently guide cable connections visually to restore the specific cabling configuration.

In one embodiment, each CME 16 is configured with an ability to communicate with its peers (the other CMEs 16) on the other chassis 20, in which case the CME 16 on one of the chassis 20 may include the management appliance. In another embodiment, the management appliance 18 resides in one of the chassis 20 on hardware separate from the CME 16 of that chassis 20, and the management appliance 18 has connectivity to each of the CMEs 16 via a common inter-chassis management network. Each CME 16 has control of the local chassis resources in the chassis 20 on which it resides. This control is normally hardwired into a fixed configuration, requiring no cabling to arrive at a configuration where an embodiment of this invention can be employed. That is, the dependencies between the LEDs or other visual indicators 22 and the CME 16 of a particular chassis 20 are met by hard configuration at the factory. There is a requirement for the CMEs 16 to be connected to a common management network in order to perform the re-assembly sequencing. However, this cabling is generally not port-specific and would be considered a precursor to the reassembly, not part of the chassis reconfiguration process. In an embodiment of the invention where all cables 12 are given a unique LED/lamp sequencing, this connectivity is no longer required. For example, in a configuration wherein six cables are used to connect twelve ports, six distinct LED sequences can be illuminated on the twelve ports without loss of fidelity.

The CME 16 on each chassis 20 can detect when any of its ports is disconnected from the port of another chassis 20 (i.e. the other port in the corresponding port pair). For example, a presence detector may be included with each port 14 to detect the physical removal of an end of a cable from that port 14. In one embodiment of a presence detector, a port 14 on a chassis 20 may detect when it has become disconnected from the other port in the corresponding port pair by the loss of electrical communication between the two ports 14 in the port pair, without directly sensing the physical removal of the cable. In this embodiment, the loss of electrical communication between the two ports 14 of the port pair indicate that the port pair is disconnected regardless of whether the cable 12 is removed from one or both ports 14 of a port pair. For example, port pair B4-D2 will be disconnected as a result of removing either a first end 13 from port D2 or a second end 15 from port B4, although both ends 13, 15 of that cable 12 will typically be removed during disassembly. The management appliance 18 electronically monitors and records a disconnection sequence, which is the sequence in which port pairs are disconnected by removing a cable from at least one port of the respective port pair.

In disassembling the system 10, the six cables 12 labeled from Cable 1 to Cable 6 are removed, in that order, from the ports 14, to disconnect all of the port pairs C4-D3, B4-D2, etc. It should be understood that this particular order of cable removal is not necessary for the functioning of the method. Rather, the cable removal order is presented for the purpose of providing a specific example. The cable numbers were then assigned to conveniently facilitate discussion of this order. In an actual implementation of the system, the cable removal order may vary and there is no need to actually label or number any of the cables (though they may be labeled for further convenience), ports or chassis.

During disassembly, Chassis A is purposely the last chassis 20 to be fully disconnected, so that the management appliance 18 may be continually informed of the removal of cables 12 from the ports 14 of the other three chassis 20. During the disassembly process, each cable 12 is removed at one or both ends 13, 15 from the respective port 14 to which it is shown connected in FIG. 1. Although removing just one end of a cable 12 has the effect of disconnecting the corresponding port pair, each cable 12 will typically be fully removed from both ports 14 of a respective port pair in the process of disassembling the system 10, which as a practical matter allows the cables 12 to be transported separately from the chassis 20. During disassembly, the management appliance 18 monitors and stores the order in which all of the cables 12 in the system 10 are disconnected, while the CME 16 of each individual chassis 20 monitors and stores the order of disconnections involving its own ports 14, as well as the order in which the individual chassis was fully disconnected. Optionally, the data collected by the management appliance 18 and the CME 16, as a result of monitoring the disassembly, is stored in tables, such as those shown in FIG. 2.

Figure 2:
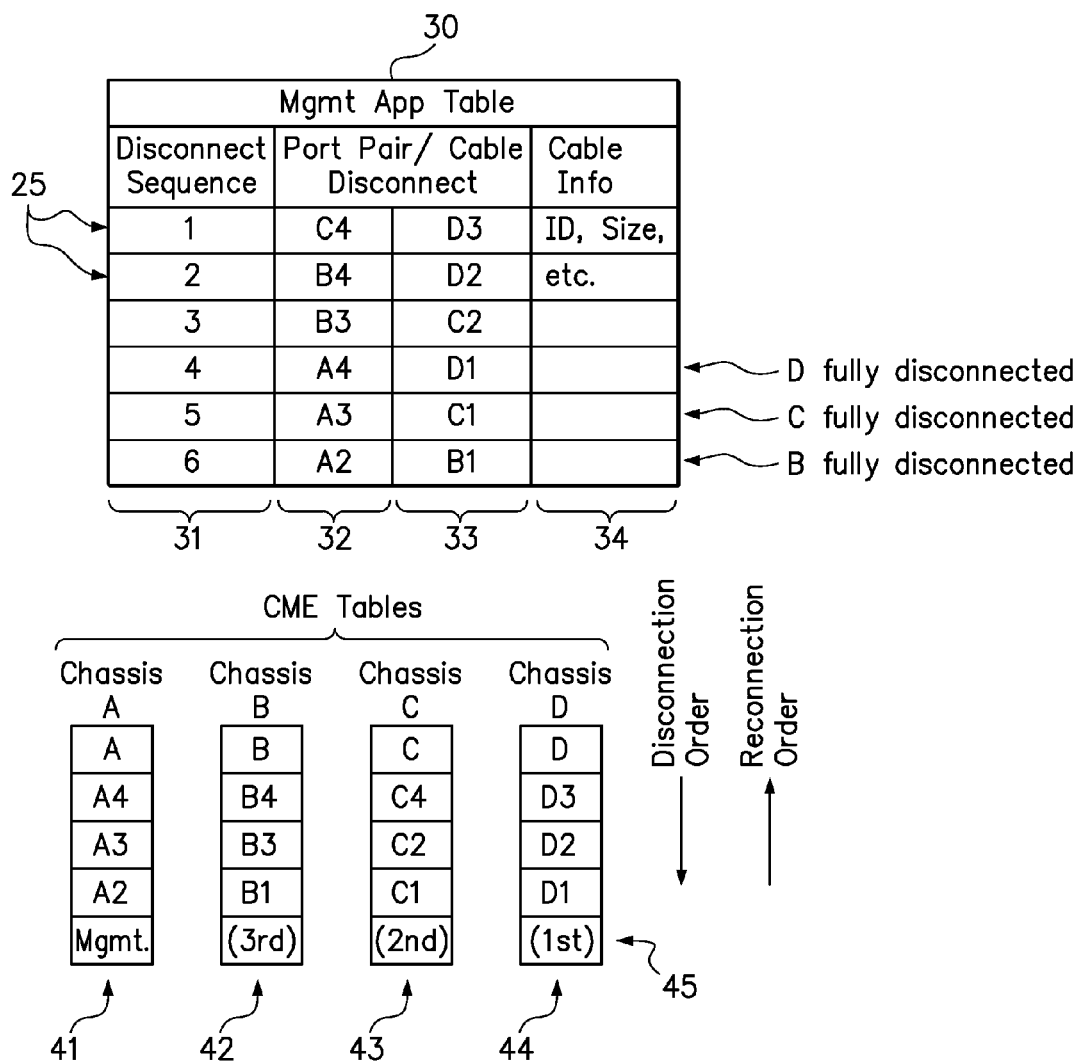
FIG. 2 is a group of tables that provide information about port disconnection during disassembly of the system.

FIG. 2 is a group of tables 30, 41-44 storing information that is collected by the CME 16 and management appliance 18 during disassembly of the system 10. One table is a management appliance table 30 residing on the management appliance 18 that tracks the order in which the port pairs are disconnected as the six cables 12 are sequentially disconnected from the system 10 (i.e. a "disconnection sequence"). The management appliance table 30 may be generated by and stored on the management appliance 18, which resides on the master chassis. Additionally, CME tables 41-44 are also generated for the individual chassis 20. Each CME table 41-44 indicates the sequence in which the ports of the respective chassis 20 are disconnected from the other port (residing on another chassis) of the corresponding port pair. Each CME Table 41-44 may be stored on the CME 16 of the respective chassis 20. It should be recognized that it is within the scope of the present invention to store a disconnection order, a corresponding reconnection order (i.e., the reverse of the disconnection order), or both.

Referring first to the management appliance table 30, a total of six rows 35 are provided, with each row relating to one of the port pairs from the fully cabled system 10 of FIG. 1. Column 31 indicates the sequence in which the port pairs are disconnected. Columns 32 and 33 list the identities of the ports of each disconnected port pair. Optional column 34 includes information about each cable. This cable information may include an identity of the cable so that the same cable may be used to reconnect the ports of the port pair when the system 10 is reassembled. The information about the Cable 12 may be automatically collected before the cable is disconnected. Such information may include a size and/or type of the cable, so that a cable of the same type and having the same or similar size (but not necessarily the same cable) may be used to subsequently reconnect the ports of the port pair. In an optional embodiment, the visual indicators 22 may be used for the additional purpose of indicating the type, size or length of cable necessary to form the connection.

The first cable that was removed in the previous disconnection sequence (Cable 1) disconnected ports C4 and D3. Thus, the first row 35 of the management appliance table 30 indicates that port pair C4-D3 was the first port pair to be disconnected in the disconnection sequence. Similarly, the second row indicates port pair B4-D2 was the second port pair to be disconnected; the third row indicates port pair B3-C2 was the third port pair to be disconnected; the fourth row indicates port pair A4-D1 was the fourth port pair to be disconnected; the fifth row indicates port pair A3-C1 was the fifth port pair to be disconnected; and the sixth row indicates port pair A2-B1 was the sixth and final port pair to be disconnected in the disconnection sequence of column 31. It should be emphasized that this data is typically collected and stored as each port pair is disconnected. This is not a predetermined sequence, but a record of what actually happened during disassembly of the system.

The management appliance table 30 may be generated by the management appliance 18, according to disconnections reported by the CMEs 16 on the four chassis 20. Chassis A is purposely the last chassis to be fully disconnected. In the illustrated example, the disassembly is performed so that Chassis B happens to be the last chassis to be fully disconnected from the master Chassis A, which allows the management appliance 18, on Chassis A, to monitor the entire disconnection sequence. The restriction of Chassis A being the last chassis to be fully disconnected may be enforced via disassembly instructions. In one embodiment, a chassis management controller is included in the chassis, and the chassis management controller may be provided with control logic to identify the master chassis. In another embodiment, the designation of a master chassis may be electronically contained within the CME 16 of the master chassis. The identity of a particular chassis as being the master chassis may be conveyed to the person disassembling the system, such as via an LED or other electronic visual indicator. Information about each port pair disconnected in the disconnection sequence may be communicated to the management appliance 18 on Chassis A via any of the remaining cable connections. For example, when port pair B3-C2 is disconnected by removal of Cable 3, the removal of Cable 3 may be communicated either from Chassis B to Chassis A via Cable 6 or from Chassis C to Chassis A via Cable 5. As another example, when port pair A3-C1 is disconnected by removal of Cable 5, the management appliance 18 on Chassis A may directly detect that the connection between port pair A3-C1 is no longer present.

Each chassis 20 is fully disconnected when none of its ports 14 remain connected to a port of another chassis. The determination of when each chassis 20 becomes fully disconnected may be determined from the information stored in the management appliance table 30. In particular, it may be determined from the management appliance table 30 when every port 14 of a chassis 20 that was initially connected to the port of another chassis in FIG. 1 is subsequently no longer connected. For example, in the fully cabled system 10 of FIG. 1, Chassis D is initially connected at ports D1, D2, and D3 to ports of the other three chassis 20. It may be determined from the management appliance table 30 that Chassis D becomes fully disconnected in step 4 of the disconnection sequence (via disconnection of Cable 4), when all three ports D1, D2, and D3 have been disconnected. It may be similarly determined from the management appliance table 30 that Chassis C becomes fully disconnected in step 5 of the disconnection sequence (via disconnection of Cable 5), and that Chassis B becomes fully disconnected from Chassis A in step 6 of the disconnection sequence (via disconnection of Cable 6).

Each CME table 41-44 is stored in memory accessible to the CME 16 that resides within the respective chassis 20. Each CME table 41-44 identifies the order in which the ports of the respective chassis 20 were disconnected from their respective port pairs. Specifically, the CME table 41 for Chassis A resides on the CME 16 of Chassis A, and reflects that the ports of Chassis A were disconnected from their associated port pairs in the order of A4, A3 and then A2 (i.e., the ports are listed from top to bottom in the CME table in the order in which they were disconnected). Likewise, the CME table 42 for Chassis B indicates that the ports of Chassis B were disconnected in the order B4, B3, B1; the CME table 43 for Chassis C indicates that the ports of Chassis C were disconnected in the order C4, C2, C1; and the CME Table 44 for Chassis D indicates that the ports of Chassis D were disconnected in the order D3, D2, D1. The last row 45 of each CME table 41-44 indicates the order in which the respective chassis became fully disconnected from Chassis A. That is, the CME table 44 for Chassis D indicates that Chassis D was the first chassis to become fully disconnected, the CME table 43 for Chassis C indicates that Chassis C was the second chassis to become fully disconnected, and the CME table 42 indicates that Chassis B was the last chassis to become fully disconnected from Chassis A. Chassis A is merely designated as the chassis containing the management appliance. Again, it should be emphasized that, for each Chassis, this data is typically collected and stored on a real time basis as each port of the Chassis is disconnected. This is not a predetermined sequence, but a record of what actually happened during disassembly of the system.

The information collected and stored in the tables 30, 41-44 will be used to guide the subsequent a re-cabling of the computer system of FIG. 1 to achieve the original cabling configuration of FIG. 1, using a re-connection sequence according to one or more embodiment of the invention. In one embodiment of a reconnection sequence, port pairs are reconnected in a reverse order of the port pair disconnection sequence. In another embodiment of a reconnection sequence, the chassis are fully reconnected in an order that is the reverse of the order in which the chassis were fully disconnected. Other reconnection sequences may be used within the scope of the invention so that the system, to guide the re-cabling of the computer system and ensure that the connections are made correctly to restore the original configuration shown in FIG. 1.

It should be recognized that, at the very initial stages of re-assembling a system, each chassis 20 is connected to a power source but does not yet have communication with any of the other chassis. Accordingly, the behavior of each chassis 20 is governed by the data that is stored and accessible by its CME 16, as well as predetermined logic or rules that are executed by the CME. While the management appliance may have enough data to fully characterize the reconnection of the system (see table 30), the individual CMEs 16 only have access to their own data (see tables 41-44) and logic. Each CME 16 will implement the predetermined logic or rules that govern how it should use its visual indicators 22 in combination with its data to guide an appropriate re-connection sequence.

In one embodiment, the CME logic or rules may be expressed as follows:

(1) The chassis in the system should be fully reconnected in the reverse of the order in which they were disconnected. Accordingly, the chassis with the management appliance is the first chassis to be fully reconnected. When one chassis completes its full reconnection, then at least the next chassis is notified of its turn to be fully reconnected.

(2) The ports of an individual chassis should be reconnected in the reverse of the order in which they were disconnected.

(3) When a chassis is having its turn being fully reconnected, then its visual indicators should blink in accordance with the order in which its ports should be reconnected. For clarity, it is preferred that the chassis having its turn being fully reconnected will only blink its next port to be reconnected, but the other ports to be reconnected in that chassis may simultaneously blink since they will blink a different number of times.

(4) When a chassis is not having its turn being fully reconnected, then the next port in that chassis to be reconnected should blink its visual indicator a number of times in accordance with its current place in the order to be reconnected to the chassis with the management appliance. For example, in a four chassis system, the last chassis to be fully reconnected would initially be the third chassis to be fully reconnected to the chassis with the management appliance, so its first port to be reconnected should blink three times. However, after two chassis have been fully reconnected, the last chassis to be fully reconnected would be in second place to be fully reconnected since only two chassis are still not fully reconnected.

In accordance with the rules of the foregoing embodiment, FIG. 3 is a chart 50 representing a sequence of illumination patterns of the visual indicators 22 for guiding the re-cabling of the four chassis 20 of FIG. 1. Each row of the table 50 represents an illumination pattern of the visual indicators at a particular step of a re-connection sequence. During each step, the visual pattern identifies ports of a single port pair to be reconnected, so that a human operator may connect opposing ends of a cable to the ports of the port pair. Any visual pattern may be used. In this embodiment, by way of example, the visual pattern comprises a number of blinks, separated by a pause. In the table 50, a single blink is represented by a "1," two blinks in close succession followed by a pause are represented by a "2," and three blinks in close succession followed by a pause are represented by a "3." A dash ("-") represents a non-blinking port. Ports that are blinking the same number of times should be connected by a cable.

The illumination patterns of the various ports at each step may be independently determined by each chassis from the information contained within the CME tables 41-44 of FIG. 2. Although the management application table 30 is more instructive of the overall reconnection process, it is not necessary to maintain such a table to perform the reconnection sequence of the present embodiment. Still, the management application table 30 might be helpful to assure proper reconnection on a system if one chassis was damaged in shipment and had to be replaced with a unit having a CME without the proper data.

In step 1 of the reconnection sequence (row 1 of table 50 in FIG. 3), after the chassis are all powered on, each chassis blinks a visual indicator associated with one of its ports. Chassis A blinks port A2 with a "1" (single blink pattern) because it is designated as the first chassis to become fully reconnected, and port A2 was its last port disconnected. Chassis B, C and D know their disconnection order ($3^{rd}$, $2^{nd}$, $1^{st}$) and, therefore, their reconnection order ($1^{st}$, $2^{nd}$, $3^{rd}$) respectively. Chassis B will blink its first reconnection port, B1, with a "1" since Chassis B will be the first chassis to be fully reconnected after the Chassis A is fully reconnected. Chassis C will blink its first reconnection port, C1, with a "2" since Chassis C will be the second chassis (other than Chassis A) to be fully reconnected. Similarly, Chassis D will blink port D1 with a "3".

An installer will then connect a cable between the two ports blinking the same pattern. Initially, this means connecting a cable between ports A2 and B1. Once the cable establishes this connection, the connection is detected by both Chassis A and Chassis B such that the visual indicators of ports A2 and B1 may stop blinking and the CME logic moves to the next step.

In step 2, Chassis A now blinks port A3 with a "2" (double blink pattern) since Chassis A is still the chassis being fully reconnected and port A3 is the second port in its reconnection order. Chassis C still blinking port C1 with a "2". An installer will then connect a cable between ports A3 and C1. Upon connection, the visual indicators for these ports stop blinking.

In step 3, Chassis A blinks port A4 with a "3" since Chassis A is still the chassis being fully reconnected and port A4 is the third port in its reconnection order. Chassis D is still blinking port D1 with a "3". An installer will then connect a cable between ports A4 and D1. Upon connection, the visual indicators for these ports stop blinking.

At this point Chassis A is fully reconnected. Chassis B, C and D become aware of this fact, perhaps through communication over the reconnected cables. Chassis B, C and D will then decrement their chassis reconnect order. Accordingly, Chassis B takes its turn being the chassis that is being fully reconnected, and will follow the rules that apply to this new role. Chassis C is now the $1^{st}$ chassis in line to be fully reconnected and Chassis D is now the $2^{nd}$ chassis in line to be fully reconnected. Furthermore, Chassis B, C and D will decrement their port connect order numbers to reflect that one port has already been connected. For example, port B3 is the second port of Chassis B to be reconnected in the overall sequence, but, upon decrementing at the point that Chassis B begins its turn to be fully reconnected, port B3 is now the first port of Chassis B that needs to be reconnected.

In step 4, Chassis B blinks port B3 with a "1" because it is designated as the current chassis to be fully reconnected, and port B3 is its first port to be reconnected. Chassis C blinks port C2 with a "1" since port C2 is its next port to reconnect and Chassis C is now the first chassis in line to be fully reconnected (behind chassis B). Chassis D blinks port D2 with a "2" since port D2 is its next port to be reconnected and Chassis D is now the second chassis in line to be fully reconnected. An installer will then connect a cable between ports B3 and C2 since they are both blinking with a "1". Upon connection, the visual indicators for these ports stop blinking.

In step 5, Chassis B then blinks port B4 with a "2" since it is the second port to be reconnected since B began its turn being fully reconnected. An installed will then connect a cable between ports B4 and D2 since they are both blinking with a "2". At this point Chassis B is fully reconnected. Chassis C and D become aware of this fact, perhaps directly or indirectly through communication over the reconnected cables. Chassis C and D will then decrement their chassis reconnect order. Accordingly, Chassis C takes its turn being the chassis that is being fully reconnected, and will follow the rules that apply to this new role. Chassis D is now the $1^{st}$ chassis in line to be fully reconnected. Furthermore, Chassis C and D will decrement their port connect order numbers to reflect that one port has already been connected. This leaves port C4 as the first port in Chassis C that needs to be reconnected, and port D3 as the first port in Chassis D that needs to be reconnected.

In step 6, Chassis C blinks port C4 with a "1" because it is designated as the current chassis to be fully reconnected, and port C4 is its first port to be reconnected. Chassis D blinks port D3 with a "1" since port D3 is its next port to reconnect and Chassis D is now the first chassis in line to be fully reconnected (behind chassis C). Since ports C4 and D3 are both blinking a "1", an installer will then connect a cable between ports C4 and D3 and the visual indicators for these ports will stop blinking. At this point all of the chassis have been fully reconnected in the same configuration as they were prior to earlier disassembly and the process is complete.

In addition to the blinking patterns shown in FIG. 3 to guide the sequence of reconnecting the cables, visual confirmations of a completed cable connection may be provided at each step. A visual confirmation may be provided in response to the correct two ports being reconnected for a particular port pair. For example, the first two ports to be connected in the reconnection sequence are ports A2 and B1. Thus, a visual confirmation may be provided in response to a cable being successfully connected at one end to port A2 and at the other end to port B1. A visual confirmation may also be provided in response to a port pair being reconnected in the correct sequence. Alternatively, a visual warning may be provided in response to a cable being connected to the wrong ports, such as if an operator incorrectly connected one end to port A2 and the other end to port C2 when the current port pair to be reconnected is A2-B2. A visual confirmation may be another illumination pattern distinct from the other illumination patterns selected to guide the connections. For example, a change in LED color or a rapid blinking pattern that is visually distinguishable from the other blinking patterns may be selected for the visual confirmations. Another example of a visual confirmation may be that the previously illuminated visual indicators are simply turned off in response to a connection of the correct ports and/or in the correct sequence.

In an alternative embodiment, the management appliance 18 and/or the chassis management elements (CME) 16 record the cabling configuration prior to disassembly. Recording the cabling configuration prior to disassembly might include either recording each cable connection as it is made. However, recording connections as they are made requires great care to make the correct connections, since any connection errors will also be recorded. Alternatively, recording the cabling configuration might include interrogating each chassis for its connected cables and computing a series of connections according to a known workable ordering. One non-limiting example of a workable ordering could include starting at Chassis 1, Cable 1 and iterate this step through all Chassis 1 connections, then sequentially move on to each additional chassis and follow the same steps. However, if the connection ordering is important, it is necessary to compute an order since the actual connection or disconnection order was not recorded. The ability to compute an order must be embodied in a predetermined software algorithm, which represents a potential loss of flexibility in following a specific factory methodology.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   detecting the disconnection of cables between ports of a plurality of chassis in a computer system, wherein each cable initially connects a port of one chassis to a port of another chassis;
   in each chassis, electronically storing a sequence in which the ports of that chassis are disconnected and electronically storing an indication of the order in which the chassis is fully disconnected from the other chassis; and
   guiding re-cabling of the computer system by sequentially illuminating visual indicators associated with two ports to be reconnected.

2. The method of claim 1, wherein the visual indicators associated with two ports to be reconnected provide a matching illumination pattern.

3. The method of claim 1, wherein guiding re-cabling of the computer system by sequentially illuminating visual indicators associated with two ports to be reconnected, includes guiding re-cabling to sequentially reconnect the ports of each individual chassis in the reverse of the order in which the ports of that individual chassis were disconnected.

4. The method of claim 3, wherein guiding re-cabling of the computer system by sequentially illuminating visual indicators associated with two ports to be reconnected, includes:
identifying a current chassis to be fully reconnected; and
illuminating the visual indicators associated with the ports of the current chassis being fully reconnected in accordance with the order in which its ports should be reconnected.

5. The method of claim 1, wherein guiding re-cabling of the computer system by sequentially illuminating visual indicators associated with two ports to be reconnected, includes guiding re-cabling to sequentially fully reconnect each chassis in the reverse of the order in which the chassis were disconnected.

6. The method of claim 5, wherein guiding re-cabling of the computer system by sequentially illuminating visual indicators associated with two ports to be reconnected, includes:
for each chassis that is not identified as being the current chassis to be fully reconnected, illuminating the visual indicator associated with the next port in that chassis to be reconnected in accordance with that chassis current place in the order to be fully reconnected.

7. The method of claim 1, further comprising:
storing in one of the chassis the sequence in which the port pairs are disconnected during the disconnection sequence; and
communicating a reverse of the disconnection sequence to the other chassis as the other chassis are reconnected.

8. The method of claim 1, further comprising:
operating the visual indicators to generate a visual confirmation in response to each reconnection of the two ports in the pair.

9. A computer program product including computer usable program code embodied on a non-transitory computer usable storage medium, the computer program product comprising:
computer usable program code for detecting the disconnection of cables between ports of a plurality of chassis in a computer system, wherein each cable initially connects a port of one chassis to a port of another chassis;
computer usable program code for causing each chassis to electronically store a sequence in which the plurality of ports are disconnected;
computer usable program code for causing each chassis to electronically store an indication of the order in which the chassis is fully disconnected from the other chassis; and
computer usable program code for guiding re-cabling of the computer system by sequentially illuminating visual indicators associated with two ports to be reconnected.

10. The computer program product of claim 9, wherein computer usable program code for guiding re-cabling of the computer system by sequentially illuminating visual indicators associated with two ports to be reconnected, includes computer usable program code for guiding re-cabling to sequentially reconnect the ports of each individual chassis in the reverse of the order in which the ports of that individual chassis were disconnected.

11. The computer program product of claim 9, wherein computer usable program code for guiding re-cabling of the computer system by sequentially illuminating visual indicators associated with two ports to be reconnected, includes computer usable program code for guiding re-cabling to sequentially fully reconnect each chassis in the reverse of the order in which the chassis were disconnected.

12. The computer program product of claim 11, wherein guiding re-cabling of the computer system by sequentially illuminating visual indicators associated with two ports to be reconnected, includes:
computer usable program code for illuminating, for each chassis that is not identified as being the current chassis to be fully reconnected, the visual indicator associated with the next port in that chassis to be reconnected in accordance with the chassis' current place in the order to be fully reconnected.

13. The computer program product of claim 9, further comprising:
computer usable program code for operating the visual indicators to generate a visual confirmation in response to each reconnection of the two ports in the pair.

14. A computer system, comprising:
a plurality of chassis, each chassis having a plurality of communication ports;
a plurality of visual indicators on the chassis, each visual indicator uniquely associated with a respective one of the communication ports;
a plurality of cables for removably connecting the chassis in a particular cabling configuration wherein each cable connects a unique port pair consisting of a port of one chassis and a port of another chassis;
a chassis management entity residing on each chassis, each chassis management entity configured for detecting the order in which the ports of its chassis are disconnected from their respective port pairs;
wherein the chassis management entities are configured to cooperatively visually guide a re-cabling of the computer system by sequentially identifying the port pairs to be reconnected, wherein identifying each port pair includes illuminating the visual indicators of each port pair to be reconnected using a matching illumination pattern.

15. The computer system of claim 14, wherein the chassis management entity residing on each chassis is further configured to detect the order in which the chassis is fully disconnected from a master chassis.

16. The computer system of claim 14, further comprising:
a management appliance residing on one of the chassis, the management appliance configured for monitoring the disconnection of cables, including electronically recording a disconnection sequence in which the port pairs are disconnected.

17. The computer system of claim 14, wherein each chassis management entity is configured to electronically store in the respective chassis a sequence in which the ports of that chassis are disconnected from their respective port pairs, and wherein each chassis is configured to sequentially illuminate the ports of that chassis in a reverse of the sequence in which the ports of that chassis are disconnected from their respective port pairs.

18. The computer system of claim 14, wherein the management appliance is configured to store in one of the chassis the sequence in which the port pairs are disconnected during the disconnection sequence, and to communicate a reverse of the disconnection sequence to the other chassis as the other chassis are reconnected.

19. The computer system of claim 14, wherein each chassis is configured to operate the visual indicators to provide one or both of a visual confirmation in response to a reconnection of the correct two ports in each port pair and a visual notification in response to a connection of incorrect ports.

* * * * *